Figure 1:
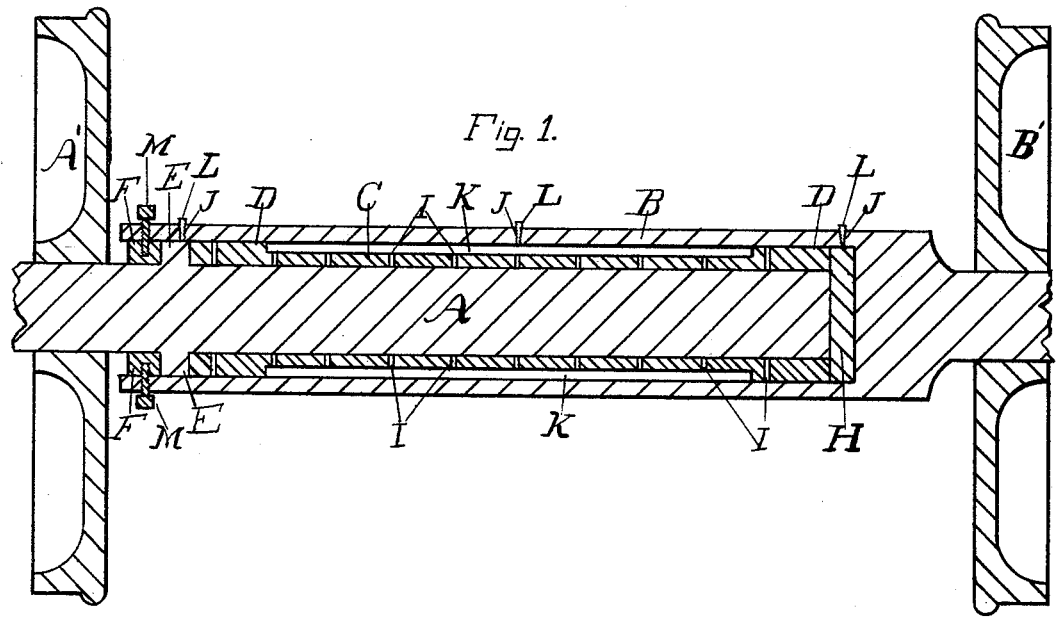

(No Model.)

O. VANORMAN.
DIVIDED CAR AXLE.

No. 415,353.  Patented Nov. 19, 1889.

Witnesses
M. C. Galer
Frank J. Finlayson

Inventor
Oliver Vanorman
by Hazard & Townsend
his attys.

UNITED STATES PATENT OFFICE.

OLIVER VANORMAN, OF LOS ANGELES, CALIFORNIA, ASSIGNOR OF ONE-HALF TO CHARLES HORACE EASON, OF SAME PLACE.

DIVIDED CAR-AXLE.

SPECIFICATION forming part of Letters Patent No. 415,353, dated November 19, 1889.

Application filed August 31, 1889. Serial No. 322,514. (No model.)

*To all whom it may concern:*

Be it known that I, OLIVER VANORMAN, a citizen of the United States, residing at Los Angeles, in the county of Los Angeles and State of California, have invented a new and useful Improvement in Divided Car-Axles, of which the following is a specification.

The bearings of divided axles are liable to become worn, thus allowing play between the parts and permitting the wheels to vary from their proper plane.

The object of my invention is to avoid this difficulty. I accomplish this object by means of the device described herein, and illustrated in the accompanying drawing, which is a longitudinal mid-section of my improved divided axle.

The axle proper consists of an arbor A, on which one wheel A' is shrunk, and a socket B, on which the wheel B' is shrunk. The arbor A is turned smooth to fit a perforated brass tube C, turned smooth on the inside to fit the arbor, and provided at the ends with annular enlargements or bosses D D, turned smooth to fit the inside of the socket B. The arbor A is provided with an enlargement or collar E near the end adapted for wheel A', and before the wheel A' is shrunk upon the arbor a loose brass washer F is placed on the arbor, so as to be between the enlargement on collar E and the wheel A', space therefor being left between the collar and wheel. The depth of the socket is somewhat greater than required to seat the arbor, and a brass or copper disk H is fitted in the socket to receive the end of the arbor. The tube is pierced with oil-holes I, and the shell of the socket is provided with oil-holes J, through which oil can be introduced to oil the bearings. The annular chamber K between the collars D D of the tube serves as an oil-reservoir for the constant lubrication of the bearings. The oil-holes J are provided with screw-plugs L, to prevent the loss of oil.

In constructing my improved axle the tube C, which is equal in length to the distance from the collar E to the end of the arbor, is placed upon the arbor, and the arbor thus incased is inserted into the socket until it rests against the disk H. The socket is of such depth as to receive the incased arbor, the collar E, and washer F. The washer F is fitted against the collar E, and is then secured to the casing of the socket by screw-bolts M.

All the bearings of my divided axle are brass against iron, except the small bearing of the collar E against the casing or socket C, and provision is made for perfect lubrication. If desired, the annular chamber K may be filled with cotton-waste, after the manner of axle-boxes.

Now, having described my invention, what I claim as new, and desire to secure by Letters Patent, is—

1. In a divided car-axle, the combination set forth of the arbor A, provided with fixed collar E, socket B, provided with oil-hole J, perforated tube C, provided with annular bosses D D, and washer F, secured to the socket.

2. In a divided car-axle such as set forth the perforated tube C, having annular bosses D D at the ends thereof, as and for the purpose set forth.

3. In a divided car-axle, the combination set forth of the arbor A, provided with fixed collar E, the socket B, provided with oil-hole J and plugs L, the perforated brass tube C, provided with bosses D, the disk H, the collar F, and bolts M.

OLIVER VANORMAN.

Witnesses:
JAMES R. TOWNSEND,
M. C. GALER.